United States Patent [19]

Crooks et al.

[11] Patent Number: 5,587,560
[45] Date of Patent: Dec. 24, 1996

[54] PORTABLE HANDWRITTEN DATA CAPTURE DEVICE AND METHOD OF USING

[75] Inventors: John F. Crooks, Duluth; Robert L. Protheroe, Lawrenceville, both of Ga.

[73] Assignee: AT&T Global Information Solutions Company, Dayton, Ohio

[21] Appl. No.: 419,657

[22] Filed: Apr. 10, 1995

[51] Int. Cl.$^6$ ............... G08C 21/00; G09G 3/02; G06F 17/60; G06K 5/00
[52] U.S. Cl. ............ 178/18; 178/19; 235/379; 235/380; 345/173; 345/179; 345/182; 382/119; 382/187; 382/313; 382/325
[58] Field of Search ............... 178/18, 19; 235/379, 235/380; 345/173, 179, 182; 382/119, 187, 313, 325

[56] References Cited

U.S. PATENT DOCUMENTS

| | | | |
|---|---|---|---|
| 4,730,186 | 3/1988 | Koga | 345/179 |
| 5,063,600 | 11/1991 | Norwood | 345/173 |
| 5,068,787 | 11/1991 | Pipella et al. | 364/406 |
| 5,123,064 | 6/1992 | Hacker et al. | 382/59 |
| 5,164,542 | 11/1992 | Hart | 174/35 MS |
| 5,187,645 | 2/1993 | Spalding et al. | 361/393 |
| 5,195,183 | 3/1993 | Miller et al. | 395/275 |
| 5,223,677 | 6/1993 | Kapp | 178/18 |
| 5,227,614 | 7/1993 | Danielson | 235/380 |
| 5,264,992 | 11/1993 | Hogdahl et al. | 367/681 |
| 5,265,238 | 11/1993 | Canova, Jr. et al. | 395/500 |
| 5,301,346 | 4/1994 | Notarianni | 395/800 |
| 5,336,870 | 8/1994 | Hughes et al. | 235/379 |
| 5,389,745 | 2/1995 | Sakamoto | 345/179 |
| 5,401,916 | 3/1995 | Crooks | 178/18 |
| 5,408,077 | 4/1995 | Campo | 235/380 |

*Primary Examiner*—Benedict V. Safourek
*Assistant Examiner*—Vijay Shankar
*Attorney, Agent, or Firm*—Albert L. Sessler, Jr.; Paul W. Martin

[57] ABSTRACT

A system for capturing handwritten data includes a base station, a docking station coupled to the base station and a plurality of portable handwriting capture devices, which may be in the form of pads or trays. The pads or trays normally rest in quick release slots in the docking station, and are removed from the slots when put into use. Each pad includes a digitizer for capturing handwritten information, a controller for digitizing the information, a memory for storing the digitized information and an interface for transmitting the digitized information through the docking station to the base station, where it is decoded. A paper slip may be placed over the digitizer and retained in position, where it provides visual feedback to a person writing on the pad and also provides a written record.

8 Claims, 8 Drawing Sheets

5,587,560

PORTABLE HANDWRITTEN DATA CAPTURE DEVICE AND METHOD OF USING

BACKGROUND OF THE INVENTION

The present invention relates to a portable handwritten data capture device and a method for using it, and more particularly relates to such a device which is untethered in use, has a self-contained power source and is low in cost, and to a method of inputting handwritten data into a business system by utilizing such a device.

In recent years, hand-held or portable electronic data entry devices have come into widespread use. Such devices facilitate the collection of data from a number of different locations and enable the entry of such collected data into a data processing system for further use. Most such data entry devices are relatively bulky, complex and expensive, and thus leave something to be desired in their ease of use, cost and susceptibility to theft. It would therefore be desirable to provide a portable electronic data entry device which is compact, light in weight, easy to use and inexpensive.

SUMMARY OF THE INVENTION

A small, untethered portable handwriting capture unit having an internal power supply captures, stores and forwards handwritten information to a high-performance base station or host for further processing. A paper slip on the unit provides user feedback. The unit does not contain the hardware or intelligence to do signature compression, multiple host system communication protocols, handwriting recognition or signature verification, but relies on the high performance base station to perform these tasks. A multi-slot docking station is coupled to the base station and receives a plurality of the handwriting capture units for data retrieval and battery charging.

It is accordingly an object of the present invention to provide a small, light portable handwriting capture device and a method of using such device to provide data including handwritten information to a base station for processing.

Another object is to provide a "non-intelligent" portable handwriting capture device which captures, stores and forwards handwritten information to a high-performance base station or host for further processing.

Another object is to provide a system for capturing handwritten data which comprises a base station, a docking station coupled to the base station and a plurality of portable handwriting capture devices which may be docked in the docking station.

Another object is to provide a handwriting capture system which includes a plurality of small portable handwriting capture devices, a docking station for holding said devices and receiving information from them and a high performance base station or host to which the docking station is coupled.

Another object is to provide a method for verification of a signature written on a portable handwriting capture device.

Another object is to provide a portable handwriting capture device which retains a paper slip in position for signature feedback and which has a sensor to determine when said paper slip is in place.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
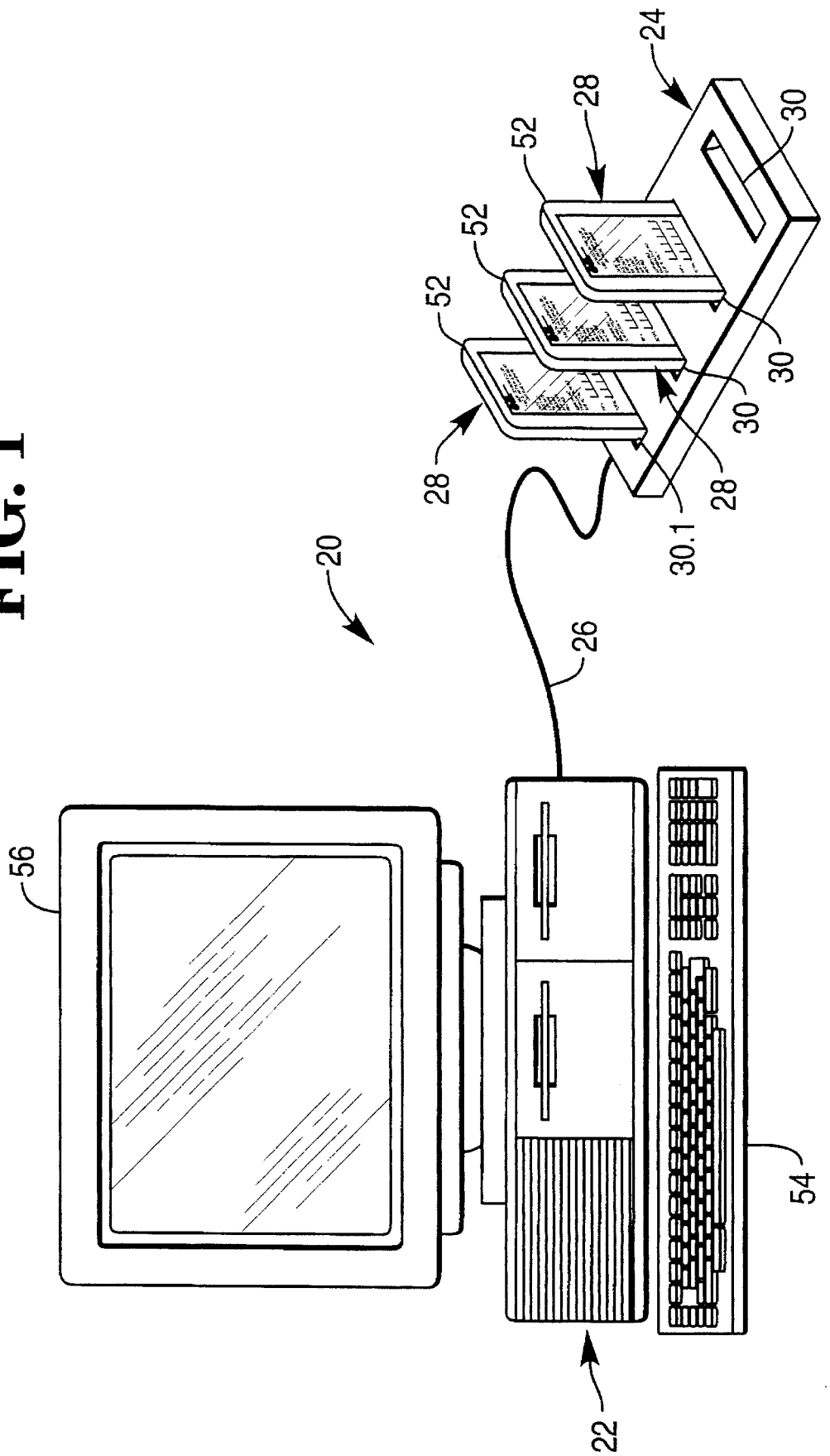
FIG. 1 is a perspective view showing a system in accordance with the present invention, comprising a base station, a docking station and a plurality of portable handwriting capture devices.

Referring now to FIG. 1, shown there is a system 20 embodying the present invention, which includes a base station 22, a docking station 24 coupled to the base station 22 by suitable means such as a cable 26, and a plurality of portable handwriting capture trays or units 28 which reside in quick disconnect slots 30 of the docking station 24 when not in use. The base station 22 may be a PC-based computer or retail transaction terminal such as the NCR PC 486 or the NCR 7052, marketed by AT&T Global Information Solutions Company, Dayton, Ohio. The docking station 24 may be coupled to the base station 22 at one of its external RS232 ports.

Figure 2:
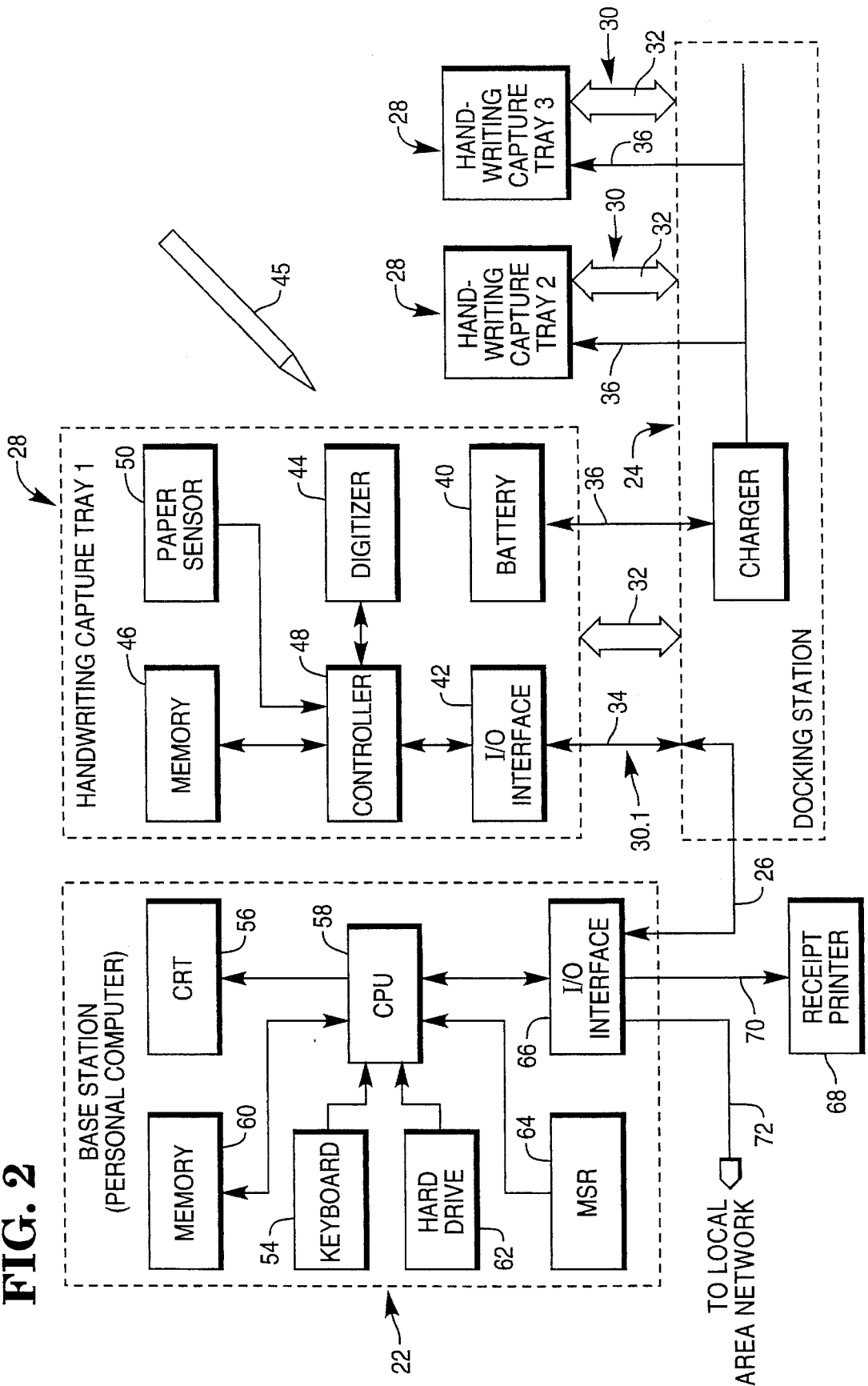
FIG. 2 is a block diagram of the system of FIG. 1.

As diagrammatically represented in FIG. 2, the docking station 24 includes a first "quick disconnect" slot 30.1 which contains a mechanical coupling 32 which may be of the frictional type to hold the tray 28 securely within the slot. In addition, a data coupling 34 provides a connection for data transfer between the tray 28 and the base station 22. A power coupling 36 provides a connection for recharging the power source in the tray 28. The data coupling 34 may be a direct electrical connection between the RS232 port of the base station 22 and corresponding electrical contacts on the tray 28. The power coupling 36 may be a simple electrical contact coupling. The data coupling 34 could alternatively comprise an infrared light source and receiver. The power coupling 36 could alternatively be an AC induction coupling. The remaining plurality of slots 30 in the docking station 24 contain only a mechanical coupling such as the coupling 32 and a power coupling such as the power coupling 36. The docking station 24 also contains a battery charger 38 to convert electrical power from an external source to the appropriate type of electrical power for recharging the power sources in the trays 28.

As shown in FIG. 2, each handwriting tray 28 includes a battery 40 to supply power to the onboard electronics in the tray 28. Each tray also includes an input/output interface 42 to transfer data to the docking station 24, a pressure-sensitive digitizer 44 for capturing handwritten data, a memory 46, a controller 48 for converting the handwritten data to digital form for storing in the memory 46 and for controlling the interface 42 and a paper sensor 50 of any suitable type which provides the controller 48 with a signal for initiating and terminating the controller's process of retrieving data from the digitizer 44 and storing it in the memory 46. All of the components mentioned above are very small and are mounted in a light-weight housing 52 which is designed to couple with the docking station 24. A pen 45 is diagrammatically represented in FIG. 2, and is used to engage the digitizer 44 to cause a signal representing handwriting to be generated by the digitizer. Depending upon the type of digitizer employed, the pen 45 may be a common pen generally used for handwriting, or may be a pen specifically designed to function with the digitizer.

Also shown in block form in FIG. 2 is the base station 22, which in the illustrated embodiment includes a keyboard 54, a display 56, a central processing unit 58, a memory 60, a hard drive 62, a magnetic stripe reader 64 and an input/output interface 66. The organization of these elements in the base station 22 is conventional and will therefore not be described in detail. A receipt printer 68 may be coupled to the base station 22 by suitable connection 70. The cable 26 couples the base station 22 to the docking station 24 as previously described, and a connection 72 may be provided to connect the base station 22 to other devices in a local area network.

Figure 3:
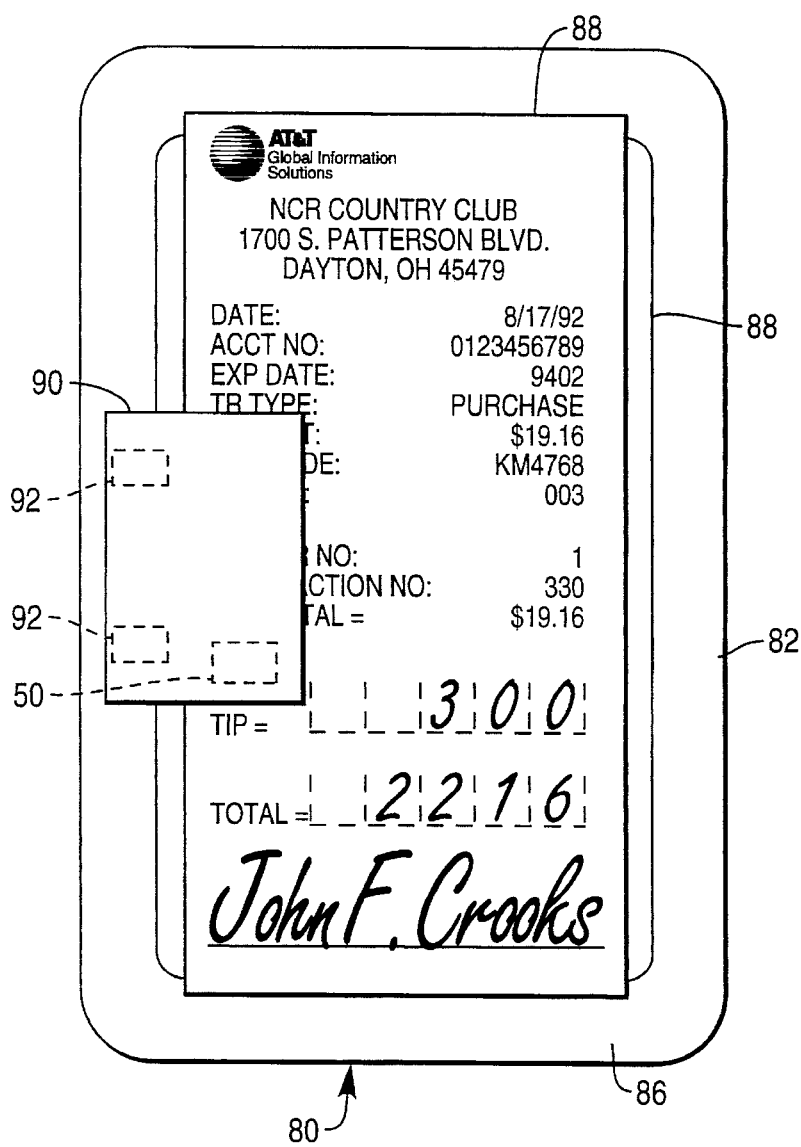
FIGS. 3 and 4 are plan and elevation views of one embodiment of a portable handwriting capture device.
Figure 4:
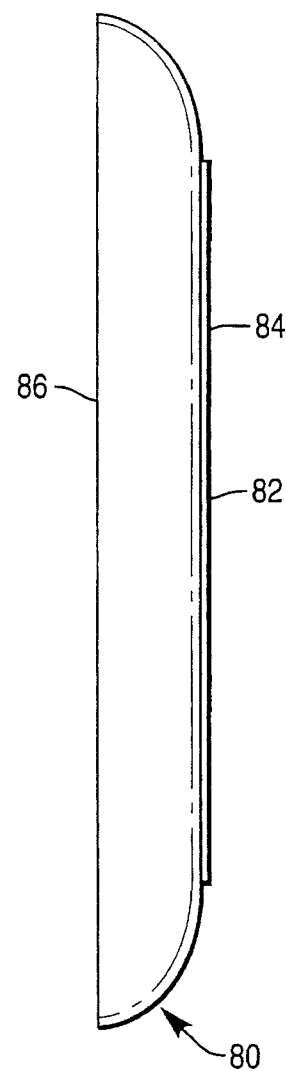

FIGS. 3 and 4 show one embodiment of a handwriting tray or pad 80. A housing 82 contains the various components 40, 42, 44 46, 48 and 50 shown in the block diagram of FIG. 2. The paper sensor 50 is also represented by the dashed-line block in FIG. 3. The housing 82 is shown in FIG. 4 as having a flat bottom 84 with rounded ends and a flat upper surface 86 which contains the digitizer 44, over which a paper slip 88 can be placed to be written upon. A clip 90 connected to the housing 82 by supports 92 retains the paper slip 88 in position on the digitizer 44. The paper sensor 50 is located so that it can detect the presence or absence of the paper slip 88 on the surface of the digitizer 44.

Figure 5:
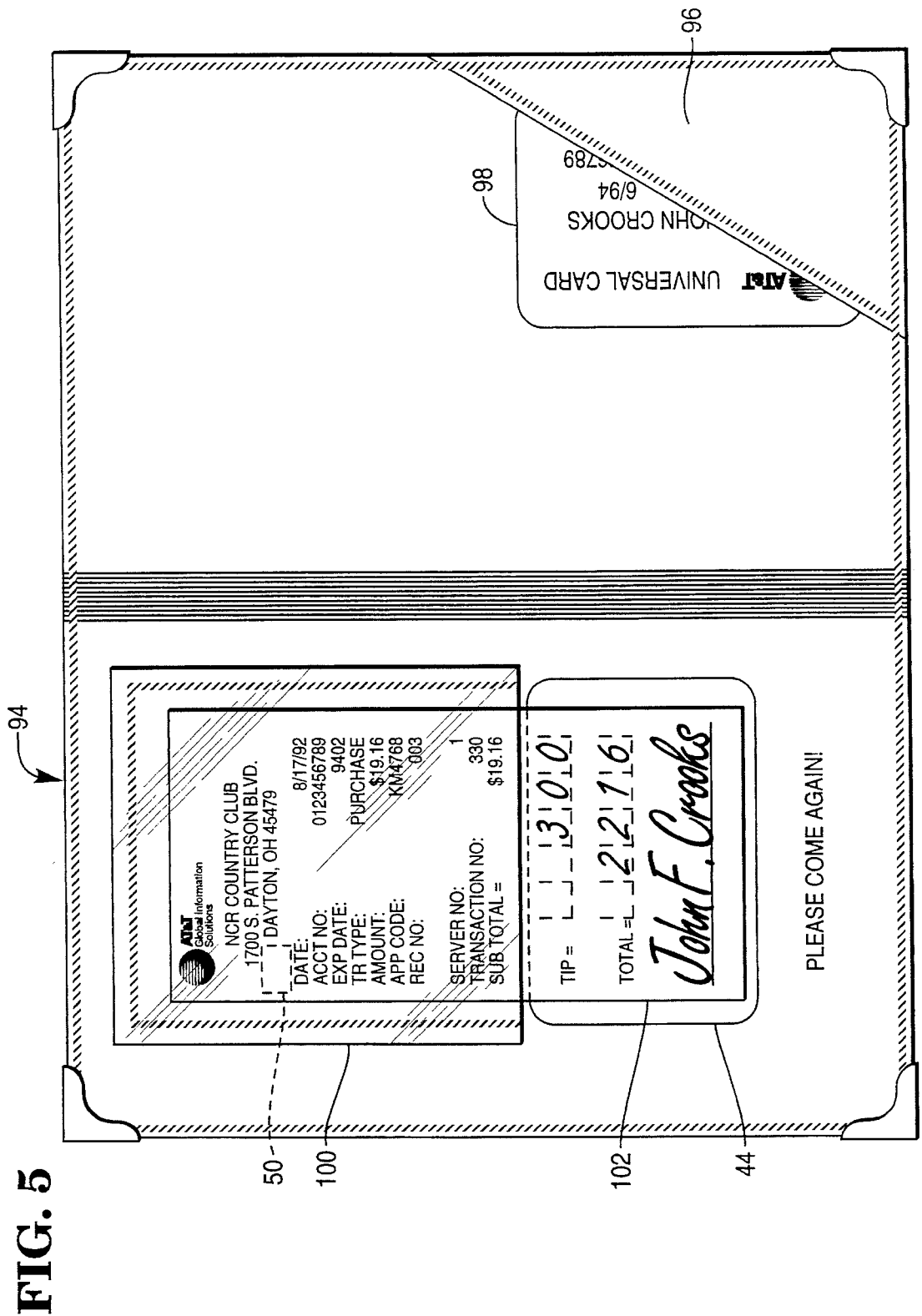
FIG. 5 is a plan view of another embodiment of a portable handwriting capture device.

A second embodiment 94 of the handwriting tray or pad is shown in FIG. 5, and resembles a clipboard or similar flat object. On the right side of the clipboard is a triangular pocket 96 for holding a credit card 98. On the left side of the clipboard, a transparent envelope or cover 100 is positioned to retain a paper slip 102 so that its lower portion is positioned over a digitizer 44. Here again, a paper sensor 50 is located so that it can detect the presence or absence of the paper slip 102 in proper position for writing on the surface of the digitizer 44.

Figure 6:
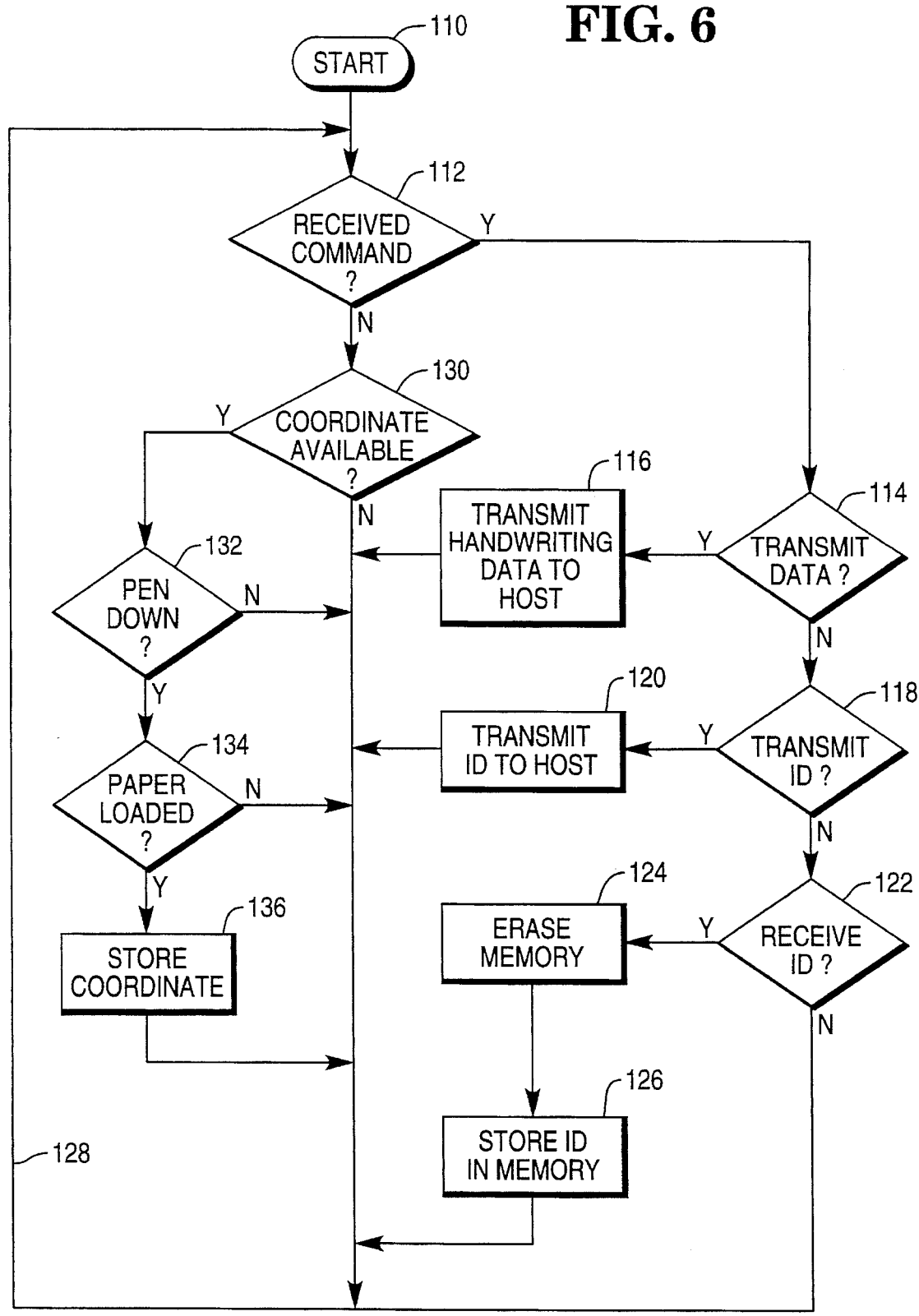
FIG. 6 is a flow diagram showing the process employed by the portable handwriting capture device in obtaining, storing and transmitting information.

The flowchart of FIG. 6 Illustrates the process by which the elements comprising the handwriting capture pad 28 interact. The process begins at block 110. Next, the controller 48 checks the interface 42 in block 112 to determine whether the base station 22 is transmitting one of three commands to the pad 28. If this is true, the controller 48 proceeds to block 114, where it determines whether or not the command is a transmit data command. If so, the controller 48 proceeds to block 116, where it transmits all of the data stored in the memory 46 to the base station 22 through the interface 34, the docking station 24 and the cable 26. If the command is not a transmit data command, the controller 48 proceeds to block 118, where it determines whether or not the command is a transmit ID number command. If so, the controller 48 proceeds to block 120, where it transmits to the base station 22 an identification number that the base station 22 previously assigned to the pad 28. If, in block 118, the controller 48 determines than the command is not a transmit ID (identification) command, it proceeds to block 122 to determine whether the command is a receive ID command. If it is a receive ID command the controller 48 proceeds to block 124, where it erases all data stored in the memory 46. The controller 48 then proceeds to block 126, where it stores the ID number that is assigned by the base station 22 in the memory 46. After performing any of the commands stated in blocks 116, 120 or 126, the controller 48 proceeds via path 128 back to block 112. Additionally, if in block 122 the controller 48 determines that the command is not a receive ID command, it returns to block 112.

If, in block 112, the controller 48 determines that it is not receiving a command from the base station 22, the controller 48 proceeds to block 130, where it determines whether or not a coordinate is available from the digitizer 44, by virtue of the associated pen being applied to the digitizer 44. If a coordinate is available, the controller proceeds to block 132 where it determines whether or not the pen is in contact with the digitizer 44. If the pen is not in contact with the digitizer 44, the controller 48 proceeds back to block 112. If the pen is in contact with the digitizer 44, the controller 48 proceeds to block 134, where it determines through the paper sensor 50 whether a piece of paper is located over the digitizer 44. If there is not any paper detected by the paper sensor 50, the controller 48 proceeds to block 112. If the sensor 50 does detect the presence of paper, the controller 48 stores the coordinate than it retrieves from the digitizer 44 in the memory 46 at block 136 and then proceeds back to block 112.

Figure 7A:
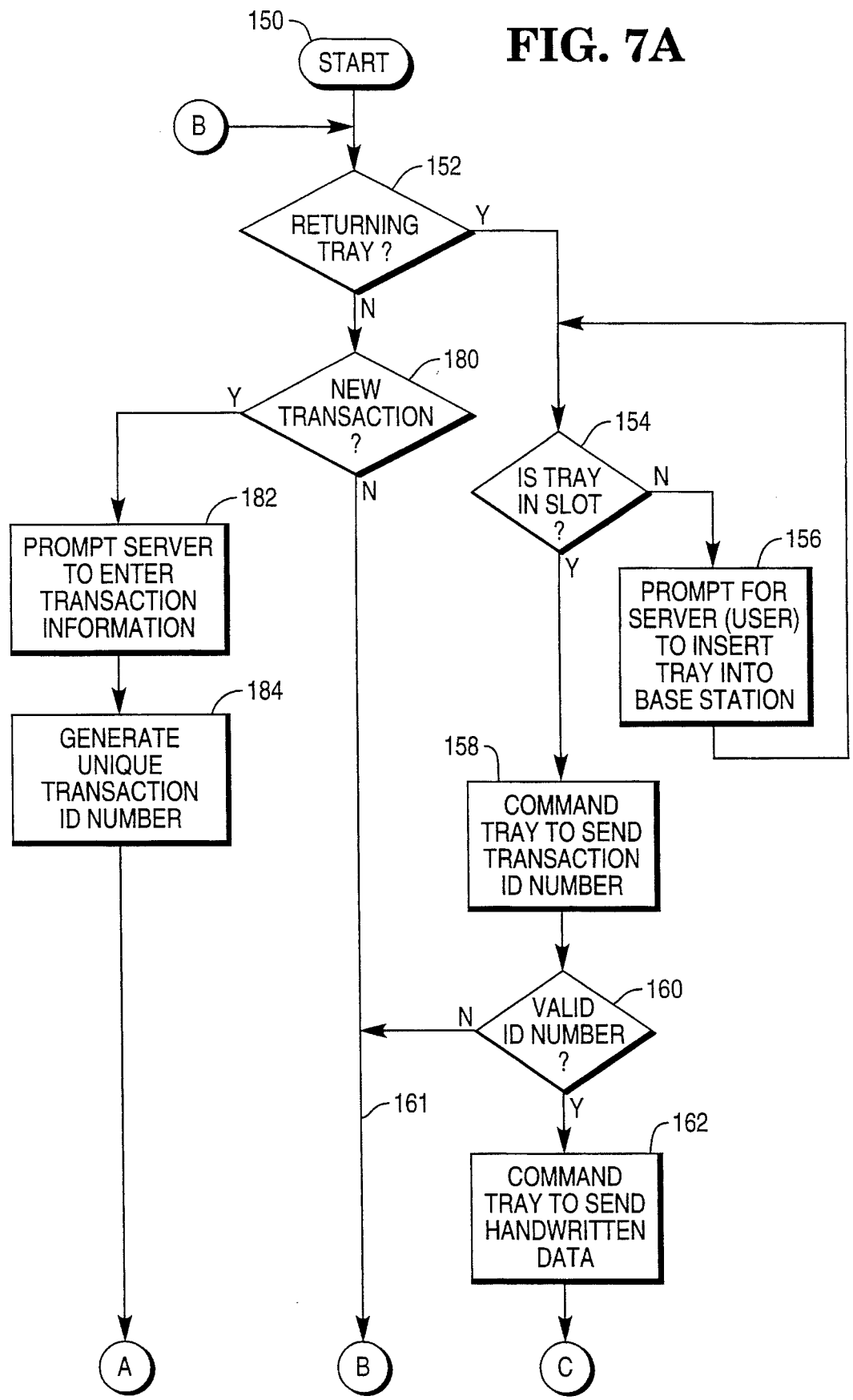
FIGS. 7A, 7B and 7C, taken together, comprise a flow diagram showing the process employed by the base station in retrieving data from the portable handwriting capture devices and converting the handwritten data to useful application data.
Figure 7B:
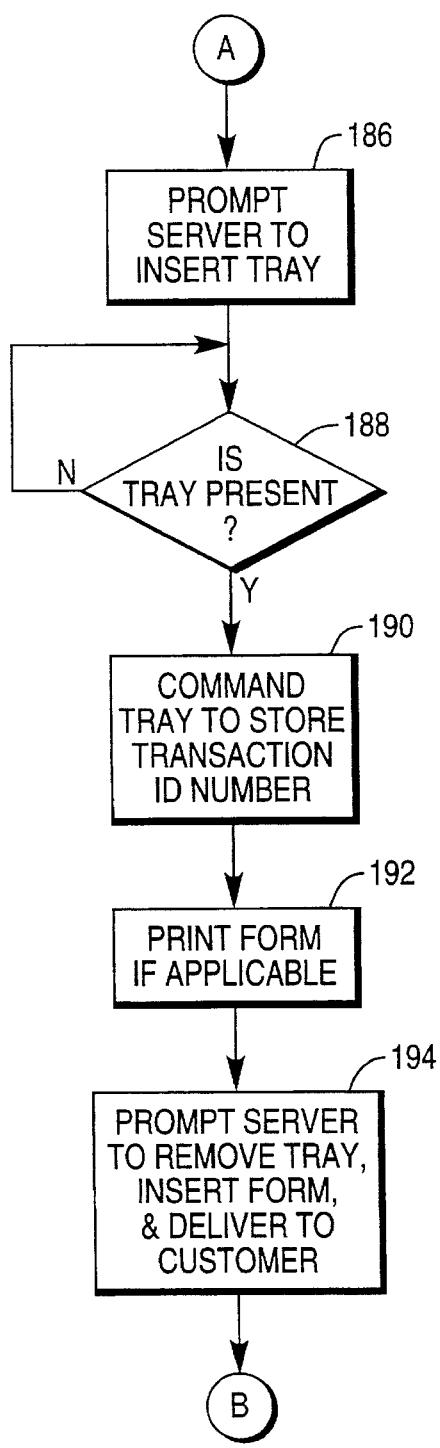
Figure 7C:
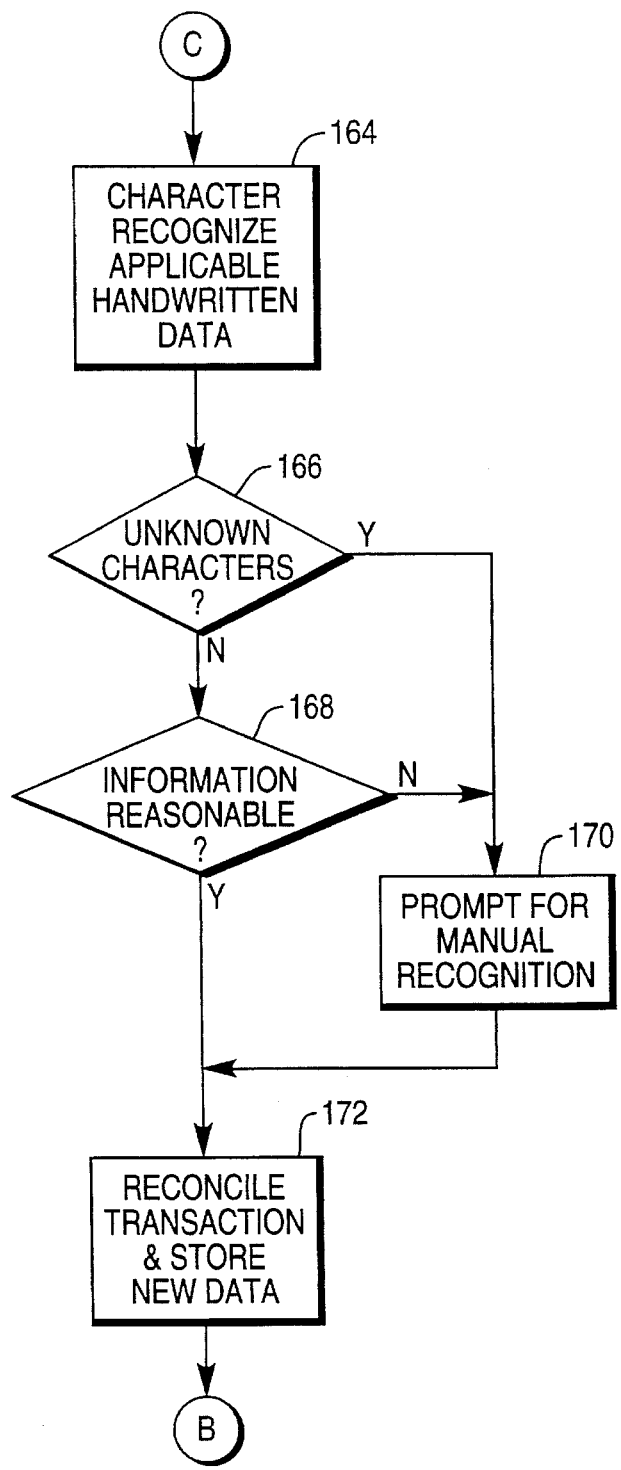

The flowcharts of FIG. 7A, 7B and 7C, taken together, illustrate the process by which the base station 22 retrieves data from the handwriting pads 28 and converts the handwritten data to useful application data. The base station commences its process with block 150, and then proceeds to block 152 where it determines from the application that it needs handwritten data from a returning tray 28. If this is the case, the base station process proceeds to block 154 where it confirms that a tray 28 is in the first slot 30.1 of the docking station 24 and that the data coupling is established. If it is not coupled, the process advances to block 156 where it prompts the user to place a pad 28 in the first slot 30.1 and then proceeds back to block 154. When a tray 28 is in the first slot 30.1 of the docking station 24 at block 154, the process proceeds to block 158 where the base station commands the tray 28 to send its transaction ID number to the base station 22. After the tray 28 has done this, the process advances to the block 160 where the base station 22 determines whether or not the transmitted number is a valid transaction number. If it is not, the process returns to the block 152 via path 161. If the transaction number is valid, the process proceeds to block 162 where it commands the tray 28 to transmit the handwritten data. The process then proceeds to block 164 (FIG. 7C) where it performs a character recognition operation on handwritten data that should represent characters. The process then determines in block 166 whether there are any unrecognizable characters. If not, in block 168, the process determines whether or not the entered characters are logically reasonable characters for that particular transaction. Such a determination may be made, for example, by checking the correctness of the addition of the printed subtotal amount due before tip and the tip in a restaurant bill, as in the form shown in FIG. 3, in which the printed subtotal of $19.16, when added to the handwritten tip amount of $3.00, correctly adds up to the handwritten total amount of $22.16. If the characters are reasonable, the process advances to block 172 where it reconciles the transaction. If, in block 168, the process finds some unrecognizable characters, the process proceeds to block 170 where it prompts the user to manually recognize the characters on the display 56 of the controller 22 before proceeding to the block 172 where it reconciles the transaction. After reconciling the transaction, the process returns to the block 152.

If the process determines in block 152 that it is not ready to receive data from a returning tray 28, the process advances to block 180 where it determines whether it is ready to prepare a tray 28 to retrieve data for a new transaction. If it is not, the process returns to block 152. However if the process is ready for a new transaction, it proceeds to block 182 where it prompts the user to enter transaction information. The process generates a unique transaction identification number (TIN) in block 184. Then, in block 186 (FIG. 7B) the process prompts the user to insert a tray 28 into the first slot 30.1 of the docking station 24. In block 188 the process waits for the user to insert a tray 28 into the first slot 30.1 of the docking station 24. After the user inserts a tray 28 the process proceeds to block 190, where it commands the tray 28 to store the transaction ID number. In block 192 the process prints the paper receipt or other document which the user positions over the digitizer 44 before collecting handwritten data. In step 194, the process prompts the user to remove the tray 28, position the document over the digitizer and present the tray 28 to the appropriate person to enter the handwritten data using the digitizer 44. The process then proceeds back to block 152.

Figure 8:
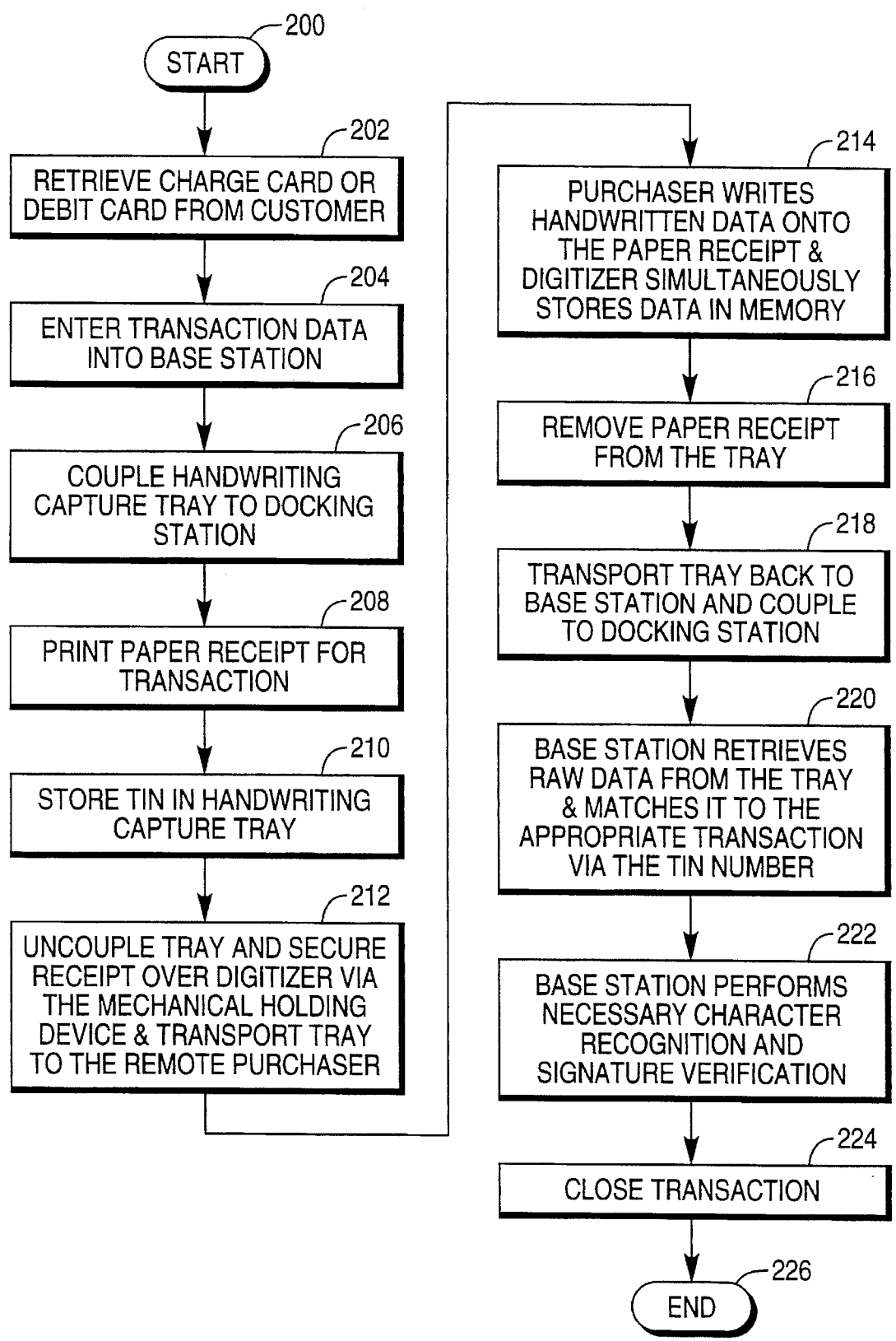
FIG. 8 is a flow diagram showing the process of completing a transaction that requires a purchaser's signature when the purchaser is not near the base station.

Shown in FIG. 8 is a flow diagram of a process for completing a transaction using the system of the present invention which requires a purchaser's signature when the purchaser is not near the point of sale terminal, or the base station 22 in the illustrated embodiment. The process commences at block 200. In the first step, as represented in block 202, a sales person retrieves a credit card or other means for charging an account from the customer. In the step represented by block 204, the sales person enters the transaction information on a point of sale terminal, such as the base station 22. This step includes passing a credit card through the magnetic stripe reader 64 if the transaction is a credit card sale. In block 206 the process prompts the sales person to place a handwriting capture pad 208 into the first slot 30.1 of the docking station 24. In block 208 the base station 22, using the printer 68, prints a receipt for the transaction with an appropriate area for the customer to sign to authorize a debit of the customer's account. In block 210 the base station 22 sends a TIN (tray identification number) to the handwriting capture tray 28. In block 212 the sales person removes the tray 28 from the docking station, secures the receipt over the digitizer 44 with the clip 90 and delivers the handwriting capture tray 28 with the receipt to the customer. In block 214 the handwritten data that is necessary to complete the transaction on the receipt is added by the customer. Typically this data will consist of a tip value, a total and a signature authorizing payment from the customer's charge account. While the purchaser is writing on the paper receipt, the digitizer in the handwriting capture pad is simultaneously storing the data in digital form in the memory 46 of the tray 28. In block 216, the customer or sales person removes the paper receipt from the tray 28. The paper receipt is the customer's record of the transaction. In block 218 the sales person returns the tray 28 to the first slot 30.1 In the docking station 24. In block 220 the base station 22 retrieves the handwritten data from the tray 28 and via the TIN matches the data to the appropriate transaction. In block 222 the base station 22 performs any necessary character recognition or signature verification to complete the transaction. The character recognition may be performed by computer algorithms, by graphically displaying the data on a video screen and prompting the sales person to visually recognize the characters and input the characters via the keyboard, or by using both methods to assure accurate recognition. In block 224 the base station 22 closes the transaction and stops at block 226.

Although the invention has been described with particular reference to preferred embodiments thereof, variations and modifications of the present invention can be effected within the spirit and scope of the following claims.

What is claimed is:

1. A method for operating a portable signature capture device having a digitizer, said portable handwriting capture device operating in association with a computer and a docking station, comprising the following steps:

(a) determining whether the computer is transmitting a command to the portable signature capture device;

(b) if step (a) is true, determining whether the command is a command to transmit data;

(c) if step (b) is true, transmitting data to the computer;

(d) if step (a) is not true, determining whether a coordinate is available from the digitizer to obtain data from the digitizer;

(e) if step (d) is true, determining whether a pen is in contact with the digitizer;

(f) if step (e) is true, determining whether a paper slip is located over the digitizer; and (g) if step (f) is true, storing the coordinate and repeating the process for obtaining another coordinate.

2. A method for operating a portable signature capture device having a digitizer, said portable handwriting capture device operating in association with a computer and a docking station, comprising the following steps:

(a) determining whether the computer is transmitting a command to the portable signature capture device;

(b) if step (a) is true, determining whether the command is a command to transmit data;

(c) if step (b) is true, transmitting data to the computer;

(d) if step (b) is not true, determining whether the command is a command to transmit identification data for the portable signature capture device to the computer;

(e) if step (d) is true, transmitting identification data to the computer;

(f) if step (d) is not true, determining whether the command is a command to receive identification data from the computer;

(g) if step (f) is true, erasing a memory in the portable signature capture device and storing received identification data in said memory; and (h) returning to step (a).

3. A method for retrieving handwritten data from a portable signature capture device and converting it to useful information by a computer, comprising the following steps:

(a) determining by the computer that it needs said handwritten data from the portable signature capture device;

(b) confirming that the portable signature capture device is in a receptacle of a docking station for transmission of said handwritten data;

(c) if said portable handwriting capture device is not in said receptacle, prompting to cause said portable handwriting capture device to be placed in said receptacle;

(d) commanding said portable handwriting capture device to send an identification number to the computer;

(e) determining that the transmitted identification number is valid;

(f) commanding said portable handwriting capture device to transmit said handwritten data;

(g) transmitting said handwritten data by said portable handwriting capture device;

(h) performing by the computer a character recognition operation on the received handwritten data;

(i) determining whether or not said handwritten data includes any unrecognizable characters;

(j) if step (i) is true, prompting a user to manually recognize the unrecognizable characters;

(k) if step (i) is not true, determining whether the recognized characters are logically reasonable characters for the transaction being performed;

(l) if step (k) is not true, prompting a user to manually recognize the characters; and (m) if step (k) is true, reconciling the transaction, storing the handwritten data and returning to step (a).

4. The method of claim 3, in which step (k) comprises the following substeps:

(k-1) adding amounts contained in the handwritten data; and (k-2) determining whether the addition agrees with a handwritten total amount contained in the handwritten data.

5. A method controlled by a computer for causing handwritten data to be entered on a portable handwriting capture device having a digitizer for use by a computer, comprising the following steps:

(a) determining that the computer is ready for a new transaction;

(b) prompting a person having the portable handwriting capture device to enter transaction information;

(c) generating a unique transaction identification number;

(d) prompting said person to insert the portable handwriting capture device into a docking station coupled to said computer;

(e) determining that the portable handwriting capture device is present in the docking station;

(f) commanding the portable handwriting capture device to store the unique transaction identification number (g) printing of a paper form by the computer;

(h) prompting said person to remove the portable handwriting capture device from the docking station, insert the form on said portable handwriting capture device and deliver said portable handwriting capture device to a customer for writing data on the form and the digitizer of said portable handwriting capture device;

(i) writing said data by said customer; and (j) returning said portable handwriting capture device to said docking station for transmission of said data to said computer.

6. A method for completing a transaction using a system which includes a computer, at least one portable handwriting capture device and a docking station having receptacles for receiving said at least one portable handwriting capture device, comprising the following steps:

(a) obtaining a charge or debit card from a customer for a transaction;

(b) entering transaction data into the computer;

(c) coupling the portable handwriting capture device to the docking station;

(d) printing a paper receipt by the computer for the transaction;

(e) storing an identification number for the transaction in said portable handwriting capture device;

(f) uncoupling said portable handwriting capture device from said docking station and securing the paper receipt over the digitizer on said portable handwriting capture device;

(g) transporting said portable handwriting capture device to said customer;

(h) writing handwritten data simultaneously on said paper receipt and said digitizer by said customer and storing said handwritten data in a memory of said portable handwriting capture device;

(i) removing said paper receipt from said portable handwriting capture device;

(j) coupling said portable handwriting capture device to said docking station;

(k) retrieving said handwritten data from said portable handwriting capture device by said computer and matching said handwritten data to the transaction by the identification number; and (l) performing character recognition and signature verification of said handwritten data by said computer.

7. A method for retrieving handwritten data from a portable signature capture device and converting it to useful information by a computer, comprising the following steps:

(a) determining by the computer that it needs said handwritten data from the portable signature capture device;

(b) commanding said portable handwriting capture device to transmit said handwritten data;

(c) transmitting said handwritten data by said portable handwriting capture device;

(d) performing by the computer a character recognition operation on the received handwritten data;

(e) determining whether or not said handwritten data includes any unrecognizable characters;

(f) if step (e) is true, prompting a user to manually recognize the unrecognizable characters; and (g) reconciling the transaction, storing the handwritten data and returning to step (a).

8. A method for retrieving handwritten data from a portable signature capture device and converting it to useful information by a computer, comprising the following steps:

(a) determining by the computer that it needs the handwritten data from the portable signature capture device;

(b) commanding said portable handwriting capture device to transmit handwritten data;

(c) transmitting said handwritten data by said portable handwriting capture device;

(d) performing by the computer a character recognition operation on the received handwritten data;

(e) determining whether or not said handwritten data includes any unrecognizable characters;

(f) if step (e) is not true, determining whether the recognized characters are logically reasonable characters for the transaction being performed;

(g) if step (f) is not true, prompting a user to manually recognize the characters; and (h) if step (f) is true, reconciling the transaction, storing the handwritten data and returning to step (a).

* * * * *